United States Patent
Moberg et al.

(10) Patent No.: US 9,533,615 B2
(45) Date of Patent: Jan. 3, 2017

(54) DOOR TRIM PULL CUP AMBIENT LIGHT

(75) Inventors: Joshua L. Moberg, Milan, MI (US); Nicholas K. Middleton, Livonia, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1141 days.

(21) Appl. No.: 13/326,829

(22) Filed: Dec. 15, 2011

(65) Prior Publication Data

US 2013/0155708 A1 Jun. 20, 2013

(51) Int. Cl.
*B60Q 3/02* (2006.01)

(52) U.S. Cl.
CPC ........... *B60Q 3/0216* (2013.01); *B60Q 3/0233* (2013.01)

(58) Field of Classification Search
CPC ....... B60Q 3/0233; B60Q 3/02; B60Q 3/0203; B60Q 3/0209; B60Q 3/022; B60Q 3/0223; B60Q 3/00; B60Q 3/002
USPC .......................................... 362/501, 487, 488
See application file for complete search history.

(56) References Cited

U.S. PATENT DOCUMENTS

| | | | |
|---|---|---|---|
| 4,788,630 A | 11/1988 | Gavagan | |
| 5,158,353 A * | 10/1992 | Kimisawa | 362/501 |
| 5,647,657 A | 7/1997 | Damasky et al. | |
| 6,000,822 A | 12/1999 | Polizzi et al. | |
| 6,043,735 A | 3/2000 | Barrett | |
| 6,160,475 A | 12/2000 | Hornung et al. | |
| 6,208,241 B1 | 3/2001 | Barrett | |
| 6,536,928 B1 | 3/2003 | Hein et al. | |
| 6,974,238 B2 | 12/2005 | Sturt et al. | |
| 7,237,933 B2 | 7/2007 | Radu et al. | |
| 7,287,885 B2 * | 10/2007 | Radu et al. | 362/488 |
| 7,607,809 B2 * | 10/2009 | Misawa | 362/501 |
| 2001/0006465 A1 * | 7/2001 | Misawa | B60Q 3/0233 362/501 |
| 2003/0081401 A1 * | 5/2003 | Camarota et al. | 362/26 |
| 2006/0067083 A1 * | 3/2006 | Bogdan | B29C 45/14778 362/488 |
| 2007/0214845 A1 * | 9/2007 | Gilleo et al. | 70/208 |
| 2009/0121515 A1 * | 5/2009 | Shiono | B60N 3/026 296/146.6 |
| 2010/0214796 A1 * | 8/2010 | Iwai et al. | 362/501 |
| 2011/0170304 A1 * | 7/2011 | Fujita | 362/501 |

(Continued)

FOREIGN PATENT DOCUMENTS

CZ 102009055427 A1 * 7/2011 ............. B60Q 3/005

OTHER PUBLICATIONS

EPO Machine Translation of DE 102009055427 A1, Translated Aug. 24, 2016.*

*Primary Examiner* — Renee Chavez
*Assistant Examiner* — Christopher E Dunay
(74) *Attorney, Agent, or Firm* — Dinsmore & Shohl, LLP

(57) ABSTRACT

An interior door trim component for an automotive vehicle. The door trim component includes a main body having an exterior surface for facing the interior of the vehicle and a door pull configured to allow for pulling thereon and closing of the door of the vehicle. The door pull is spaced apart from the main body by a distance that allows the fingers of a vehicle occupant's hand to extend into the area between the door pull and the main body. A light emitting assembly is mounted adjacent to the door pull and is oriented to emit light in a direction away from the door pull and toward the exterior surface of the main body.

20 Claims, 2 Drawing Sheets

(56) References Cited

U.S. PATENT DOCUMENTS

2011/0235354 A1* 9/2011 Glazier ............... B60Q 3/0243
362/509
2011/0241544 A1* 10/2011 Murray et al. .................. 315/77

* cited by examiner

DOOR TRIM PULL CUP AMBIENT LIGHT

BACKGROUND

1. Field of the Invention

The present invention generally relates to automotive lighting. More specifically, the invention relates to ambient lighting within the passenger compartment of an automotive vehicle.

2. Description of Related Art

Most automotive vehicles are provided with various sources of light in the passenger compartment of the vehicle. Generally, interior vehicle lighting is one of three types: general lighting, task lighting, and ambient lighting.

General lighting is typically provided by mounting a light assembly to the roof or headliner of the vehicle. When mounted in this fashion, light is directed from the light assembly downwardly, generally bathing the interior of the vehicle with light. Sometime this arrangement includes lenses that direct the emitted light at a specific location or in a specific direction. For example, the light might be directed to facilitate the reading of a document, such as a map, by an occupant of the vehicle. This type of lighting is referred to as task lighting. Task lighting may be incorporated in a lamp assembly that also includes general lighting or may be provided by way of an independent lamp assembly.

The third type of lighting mentioned above is the ambient lighting. This type of lighting dimly lights the interior, or a portion of the interior, of the vehicle. The ambient lighting can come in many forms. One typical form is to provide a light assembly incorporated into the feature of the vehicle. For example, light assemblies are sometimes provided on the trim panel of a door so as to direct light so that the foot-well area for the front seat of the vehicle is dimly lit.

For each of these types of lighting techniques, it is well known to use a variety of different types of lights sources. The light sources themselves may be incandescent bulbs, light emitting diodes (LEDs) or other types of sources.

SUMMARY

The present invention provides for the ambient lighting of an automotive vehicle's interior door trim component. Accordingly, in one aspect of the invention, an interior door trim component for an automotive vehicle is provided having a main body with an exterior surface for facing the interior of the vehicle. A door pull, configured to allow for pulling and closing of the door of the vehicle, is located so as to be spaced apart from the main body by a distance allowing a vehicle occupant's fingers to extend between the door pull and the main body. Mounted adjacent to the door pull is a light emitting assembly. The light emitting assembly is oriented to direct light in a direction away from the door pull and toward the exterior surface of the main body. This direction is generally away from any occupant within the vehicle.

In another aspect of the invention, the light emitting assembly includes a lens and a light source.

In a further aspect of the invention, the door pull extends inward from the main body.

In yet another aspect of the invention, the light emitting assembly is located adjacent to an exterior surface of the door pull.

In an additional aspect of the invention, the light emitting assembly is located adjacent to an outwardly facing, exterior surface of the door pull.

In still another aspect of the invention, the door pull is located relative to the light emitting assembly so as to block light being directed in a direction away from of the main body and/or toward the vehicle occupant.

In another aspect of the invention, an interior door trim component for an automotive vehicle includes a main body having an exterior surface for facing the interior of the vehicle and an armrest projecting from the exterior surface of the main body. The armrest includes a first portion defining a generally horizontal surface for resting a vehicle occupant's arm thereon. The armrest also includes a second portion adjacent to the first portion, wherein the second portion defines a door pull that is configured to allow for pulling thereon and closing of the door of the vehicle. The door pull is spaced apart from the main body by a distance that allows the fingers of a person's hand to extend into the space between the door pull and the main body. To provide ambient lighting, a light emitting assembly is mounted adjacent to the door pull, and the light emitting assembly is oriented to direct light in a direction toward the main body.

In a further aspect of the invention, the light emitting element includes a lens and a light source.

In another aspect of the invention, the door pull defines a portion of a pull-cup, the pull-cup further including a bottom wall extending from the door pull to the main body.

In an additional aspect of the invention, light emitting element includes a lens and a light source.

In still a further aspect of the invention, the lens is located at the interface of the door pull and the bottom wall of the pull-cup.

In yet another aspect of the invention, the light source is interiorly located within the second portion of the armrest.

In an additional aspect of the invention, the door pull is positioned relative to the light emitting assembly so as to block light from being directed in a direction away from of the main body and toward the vehicle occupant.

In yet a further aspect of the invention, the light emitting assembly is located adjacent to an exterior surface of the door pull.

In still another aspect of the invention, the light emitting assembly is located adjacent to an outwardly facing exterior surface of the door pull.

Further objects, features and advantages of this invention will become readily apparent to persons skilled in the art after a review of the following description, with reference to the drawings and claims that are appended to and form a part of this specification.

DETAILED DESCRIPTION

As used herein, directional references (such as inward, outward, upward, forward, rearward, etc.) are in relation to positioning of the components when incorporated into an automotive vehicle, and particularly into its passenger compartment. As such, the forward direction is generally toward the front of the vehicle, the inward direction is generally toward the centerline of the vehicle; the outward direction is generally away from the centerline of the vehicle; the upward direction is generally toward the roof of the vehicle; and the rearward direction is generally toward the rear of the vehicle.

Figure 1:
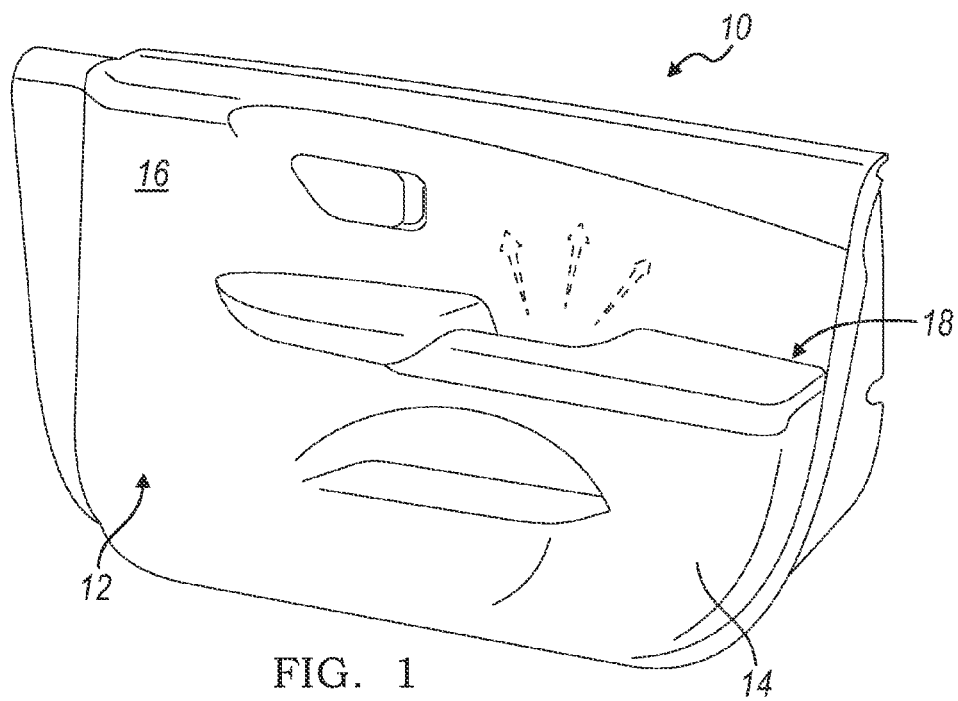
FIG. 1 is a perspective view of the interior, passenger compartment side of an automotive vehicle door.

Referring now to the drawings, an interior door trim component embodying the principles of the present invention is generally illustrated in FIG. 1 as part of a vehicle door 10. The interior door trim component, which is designated at 12, includes a main body or panel 14 whose exterior surface 16 faces the interior or inward of the vehicle. In the illustrated embodiment, an armrest 18 is integrally formed with and extends inwardly from the exterior surface 16 of the trim panel 14. The armrest 18 includes a first portion 20 that defines a generally horizontal surface 22 upon which an occupant of the vehicle may rest their arm.

Adjacent to the first portion 20 is a second portion 24, which includes a door pull 26. The door pull 26 is spaced apart from the exterior surface 16 of the panel 14 by a distance that allows the fingers of an occupant of the vehicle to be positioned therebetween. In this manner, the occupant of the vehicle can grasp the door pull 26, allowing them to pull thereon and close the door 10.

Figure 2:
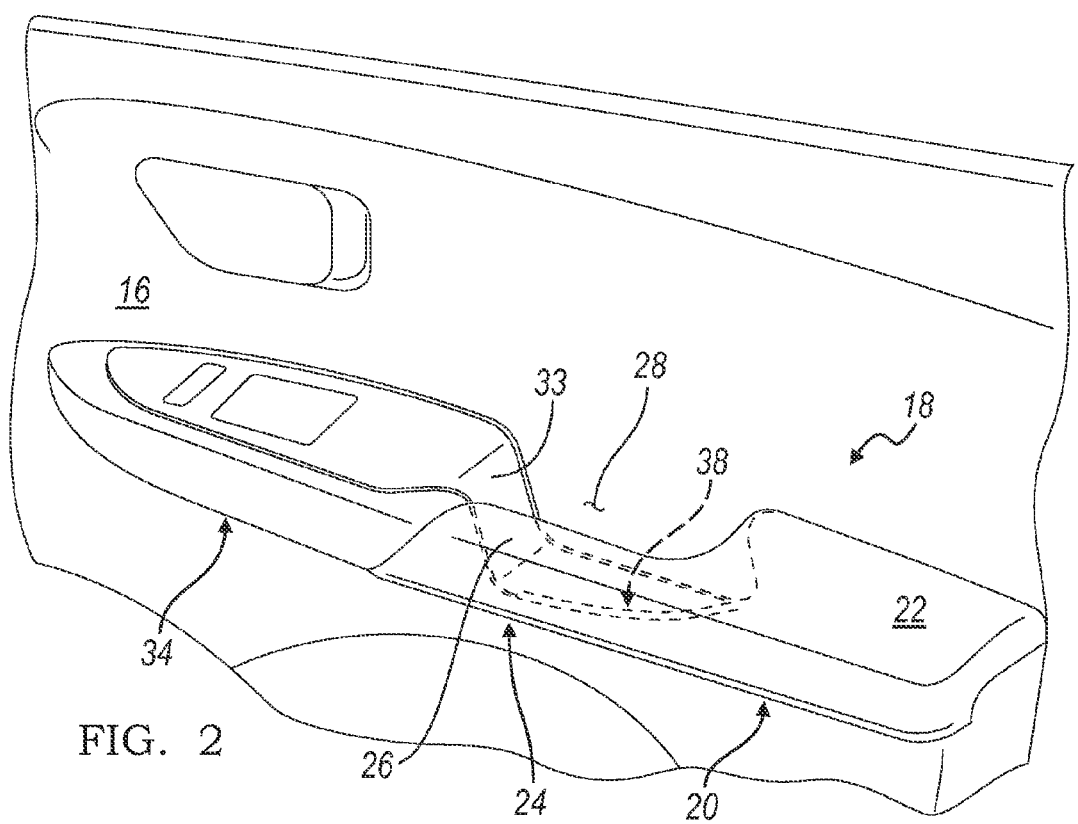
FIG. 2 is an enlarged view of the pull-cup area of the door seen in FIG. 1.

As seen in FIG. 2, the door pull 26 cooperates with other portions of the door trim component 12 to define a pull cup 28. The pull cup 28 is an enclosed space down in its interior side by an exterior surface 30 of the door pull 26, and its exterior side by the exterior surface 16 of the panel 14, and on a bottom side by a bottom wall 32. The bottom wall 32 may be integrally formed as part of the armrest and generally extends from the exterior surface 16 of the panel 14 toward the outwardly facing exterior surface 30 of the door pull 26. The forward and rearward ends 33 of the pull cup 28 are defined by other portions of the armrest 16, such as the previously mentioned first portion 20 or a third portion 34 of the armrest 18, which is separated from the first portion 20 by the door pull 26. The third portion 34 may operate as a platform on which controls, such as window and door lock switches, may be positioned.

Located within the pull cup 28 is a light emitting assembly 38. Preferably, the light emitting assembly 38 is located within the pull cup 28 generally toward the door pull 26. The light emitting assembly 38 is further made up of a light directing element or light pipe 40 and a light source 42. The light pipe 40 is positioned about the light source 42 so as to efficiently collect and direct light through the light pipe 40 toward the light emitting face 44. In the illustrated embodiment, the light source 42 is located beneath the bottom wall 32 of the pull cup 28. Alternatively, the light source 42 could be positioned within the door pull 26 or another location in the armrest 18.

Figure 3:
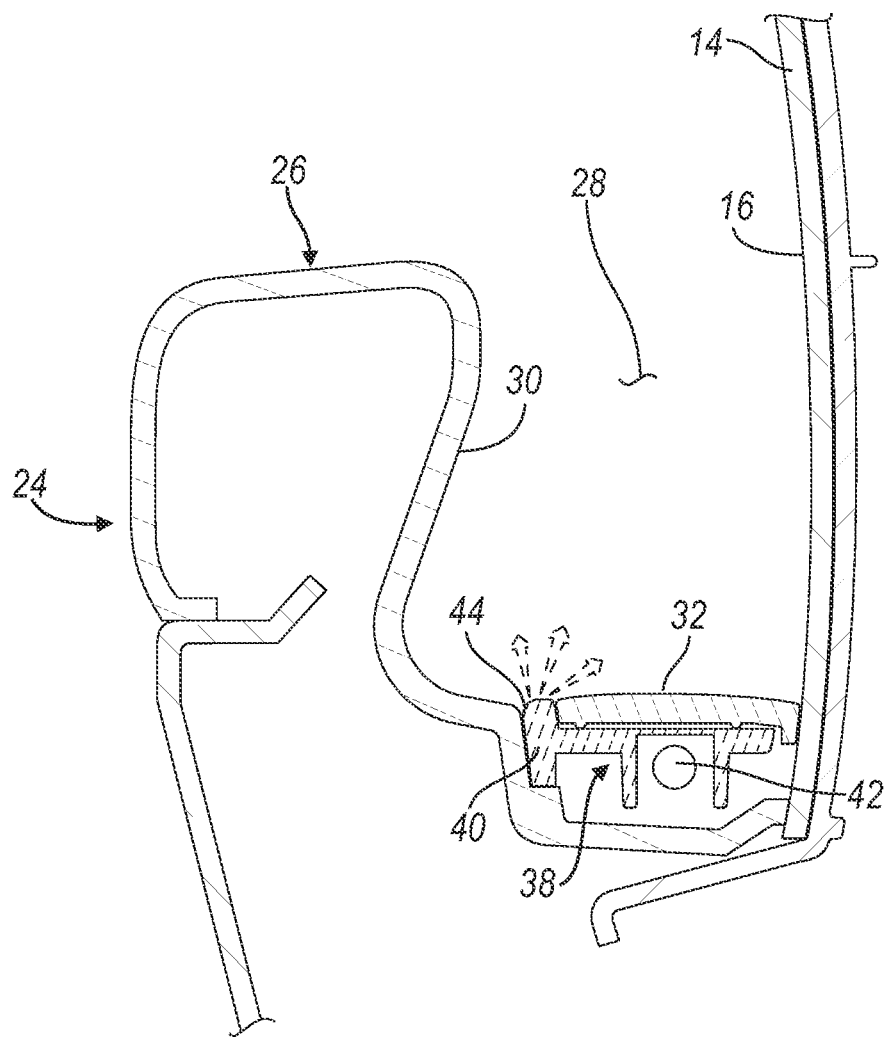
FIG. 3 is a cross-sectional view, generally taken along line 3-3 in FIG. 2, showing the lamp, lens and the directing of light pursuant to teachings of the present invention.

As seen in FIG. 3, the light emitting face 44 of the light pipe 40 is positioned generally adjacent to the door pull 26 and maybe specifically located between the bottom wall 32 and the outwardly facing exterior surface 30 of the door pull 26. Alternatively, the light emitting face 44 could be located in door pull 26 itself or in the bottom wall 32. By positioning the light emitting face 40 closer to the door pull 26 than to the panel 14, light being emitted from the light pipe 40 is directed upward and toward the exterior surface 16 of the panel 14 and upward, while being blocked by the outwardly facing exterior surface 30 of the door pull 26 and prevented from being direction inwardly towards the occupant of the vehicle. In this manner, when the occupant of the vehicle is seated in a normal driver or passenger position, the occupant cannot directly see the light emitting face 30 of the light emitting assembly 38. The light emitted by the light source 42 through the light emitting face 40, as a result, illuminates the pull cup 28 of the door trim component 12 and does not shine in the eyes of the occupants. Since the precise location of light emission from the light pipe 40 is not directly viewable by the occupant of the vehicle, this construction provides for the soft and pleasing illumination of the pull cup 28 area.

While the present invention is illustrated in connection with the pull cup 28, the invention has utility in alternative constructions. For example, the light emitting assembly could be provided with a door pull that is in the form of a pull strap or grip as opposed to a pull cap. Additionally, the principles of the present invention could be incorporated into an exterior door handle or latch of the vehicle.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. An interior door trim component for an automotive vehicle, the interior door trim component comprising:
 a main body;
 a door pull attached to the main body, a portion of the door pull being spaced apart from the main body of the interior door trim component by a distance allowing fingers of a vehicle occupant's hand to extend between the door pull and the main body, the portion of the door pull spaced apart from the main body having a top surface, an upper portion spaced a first distance apart from the main body, and a lower portion spaced a second distance apart from the main body, the first distance being less than the second distance and the upper portion tapering toward the lower portion;
 a light emitting assembly comprising a light pipe positioned around a light source and coupling light from the light source to a light emitting face, the light emitting assembly mounted adjacent to the door pull and disposed between the door pull and the main body, the light emitting assembly being oriented to emit light in an upward direction away from the door pull and toward the main body, wherein the upper portion of the door pull is oriented to block light directed toward at least the top surface of the door pull; and
 a receiving cavity defined by the light pipe, the door pull, and the main body, wherein the light source is positioned within the receiving cavity.

2. The interior door trim component of claim 1, wherein the door pull extends inwardly and has a top portion spaced from the main body.

3. The interior door trim component of claim 1, wherein the light emitting face of the light pipe is located adjacent to an exterior surface of the door pull.

4. The interior door trim component of claim 1, wherein the light emitting face of the light pipe is located adjacent to an outwardly facing exterior surface of the door pull, which outwardly facing exterior surface faces the main body, wherein the outwardly facing exterior surface of the door pull, an exterior surface of the main body, and an upward facing third surface disposed therebetween define a pull cup, wherein the light emitting assembly is located within the pull cup.

5. The interior door trim component of claim 1, wherein the door pull is located relative to light emitting face of the light pipe and is arranged to block light from the light emitting assembly from being directed away from the main body and toward the vehicle occupant.

6. The interior door trim component of claim 1, wherein the door pull is formed as part of an armrest.

7. A trim component for an automotive vehicle, the trim component comprising:
   a main body having an exterior surface;
   a door pull attached to the exterior surface of the main body, the door pull having an outwardly facing exterior surface that is spaced apart from the main body of the trim component by a distance allowing fingers of the vehicle occupant's hand to extend between the door pull and the main body;
   a bottom wall disposed between the outwardly facing exterior surface of the door pull and the exterior surface of the main body and directly above and separate from a portion of the door pull attached to the exterior surface of the main body;
   a light emitting assembly mounted adjacent to the door pull and disposed between the door pull and the main body below the bottom wall, the light emitting assembly including a light source and a light collecting element having a light emitting face, the light emitting face being oriented to direct light in an upward direction toward the main body, wherein the door pull is arranged to block light from the light emitting assembly from being directed away from the main body with at least an upper portion of the door pull, wherein the upper portion of the door pull is spaced a first distance from the exterior surface of the main body, a lower portion of the door pull is spaced a second distance from the exterior surface of the main body, and the first distance is less than the second distance; and
   the bottom wall and the portion of the door pull attached to the exterior surface of the main body defining a receiving space for the light source.

8. The trim component of claim 7, wherein the light emitting element includes a lens and a light source.

9. The trim component of claim 7, wherein the door pull defines a portion of a pull-cup, the pull-cup further including the bottom wall extending from the door pull to the main body, wherein the light emitting face is one of located between the bottom wall and the outwardly facing exterior surface of the door pull, located in the door pull, and located in the bottom wall.

10. The trim component of claim 9, wherein the light emitting element includes a lens and a light source.

11. The trim component of claim 10, wherein the lens is located at the interface of the door pull and the bottom wall of the pull-cup.

12. The trim component of claim 11, wherein the light source is interiorly located within a portion of an armrest that includes the door pull.

13. The trim component of claim 10, wherein the door pull is positioned relative to the light emitting assembly and is arranged to block light from the light emitting assembly from being directed away from the main body and toward the vehicle occupant.

14. The trim component of claim 7, wherein the light emitting assembly is located adjacent to an exterior surface of the door pull.

15. The trim component of claim 7, wherein the light emitting assembly is located adjacent to the outwardly facing exterior surface of the door pull.

16. An interior door trim component for an automotive vehicle, the interior door trim component comprising:
   a main body having an exterior surface;
   a door pull attached to the exterior surface of the main body, the door pull having an outwardly facing exterior surface that is spaced apart from the main body of the interior door trim component by a distance allowing fingers of the vehicle occupant's hand to extend between the door pull and the main body;
   a bottom wall disposed between the outwardly facing exterior surface of the door pull and the exterior surface of the main body and directly above and separate from a portion of the door pull attached to the exterior surface of the main body;
   a light emitting assembly positioned adjacent to the door pull and disposed between the door pull and the main body below the bottom wall, the light emitting assembly including a light collecting element and a light source positioned within the light collecting element, the light collecting element having a light emitting face oriented to direct light in an upward direction toward the main body; and
   the bottom wall and the portion of the door pull attached to the exterior surface of the main body defining a receiving space for the light source.

17. The interior door trim component of claim 16, wherein the light emitting face is located between the bottom wall and the outwardly facing exterior surface of the door pull.

18. The interior door trim component of claim 16, wherein the light emitting face extends through the bottom wall.

19. The interior door trim component of claim 16, wherein the door pull is formed as an integral and stationary part of an armrest and the spacing of the outwardly facing exterior surface of the door pull from the main body defined by the distance allowing fingers allowing fingers of the vehicle occupant's hand to extend between the door pull and the main body remain the same when the vehicle occupant is pulling on the door pull and when the vehicle occupant is not pulling on the door pull.

20. The interior door trim component of claim 19, wherein forward and rearward ends defined by portions of the armrest, the outwardly facing exterior surface of the door pull, the exterior surface of the main body, and the bottom wall define a pull cup, wherein:
   the pull cup defines a partially enclosed space;
   the light source is located beneath the bottom wall defining the pull cup; and
   the light emitting face is located in and extends through a space between the bottom wall and the outwardly facing exterior surface of the door pull to direct light into the partially enclosed space of the pull cup.

* * * * *

UNITED STATES PATENT AND TRADEMARK OFFICE
CERTIFICATE OF CORRECTION

| | |
|---|---|
| PATENT NO. | : 9,533,615 B2 |
| APPLICATION NO. | : 13/326829 |
| DATED | : January 3, 2017 |
| INVENTOR(S) | : Joshua L. Moberg and Nicholas K. Middleton |

It is certified that error appears in the above-identified patent and that said Letters Patent is hereby corrected as shown below:

On the Title Page

Section "FOREIGN PATENT DOCUMENTS" first reference, delete "CZ" and insert --DE--, therefor.

In the Specification

In Column 6, Line 41, after "distance allowing fingers" delete "allowing fingers".

Signed and Sealed this
Twenty-eighth Day of February, 2017

Michelle K. Lee
*Director of the United States Patent and Trademark Office*